US005239136A

United States Patent [19]

Chiari

[11] Patent Number: 5,239,136

[45] Date of Patent: Aug. 24, 1993

[54] PRESSURE ADJUSTMENT DEVICE

[75] Inventor: Franco Chiari, Bologna, Italy

[73] Assignee: Macofar S.p.A., Rastignano, Italy

[21] Appl. No.: 801,288

[22] Filed: Dec. 2, 1991

[30] Foreign Application Priority Data

Dec. 7, 1990 [IT] Italy ................................ 3770 A/90

[51] Int. Cl.⁵ ............................................ G01G 19/52

[52] U.S. Cl. ................................................... 177/50

[58] Field of Search .................................... 177/52, 50

[56] References Cited

U.S. PATENT DOCUMENTS 3,495,669 2/1970 Yeager et al. ....................... 177/194

*Primary Examiner*—George H. Miller, Jr.

*Attorney, Agent, or Firm*—Guido Modiano; Albert Josif

[57] ABSTRACT

The pressure adjustment device for adjusting the pressure applied to a bottle during a ferruling operation includes a stationary vertical column on which a sleeve is rotatably supported; the sleeve is closed, at its top, by a horizontal disk for supporting a bottle. A loading cell is arranged between the disk and the top of the column and is connected to a device for controlling the pressure which acts on the disk.

9 Claims, 1 Drawing Sheet

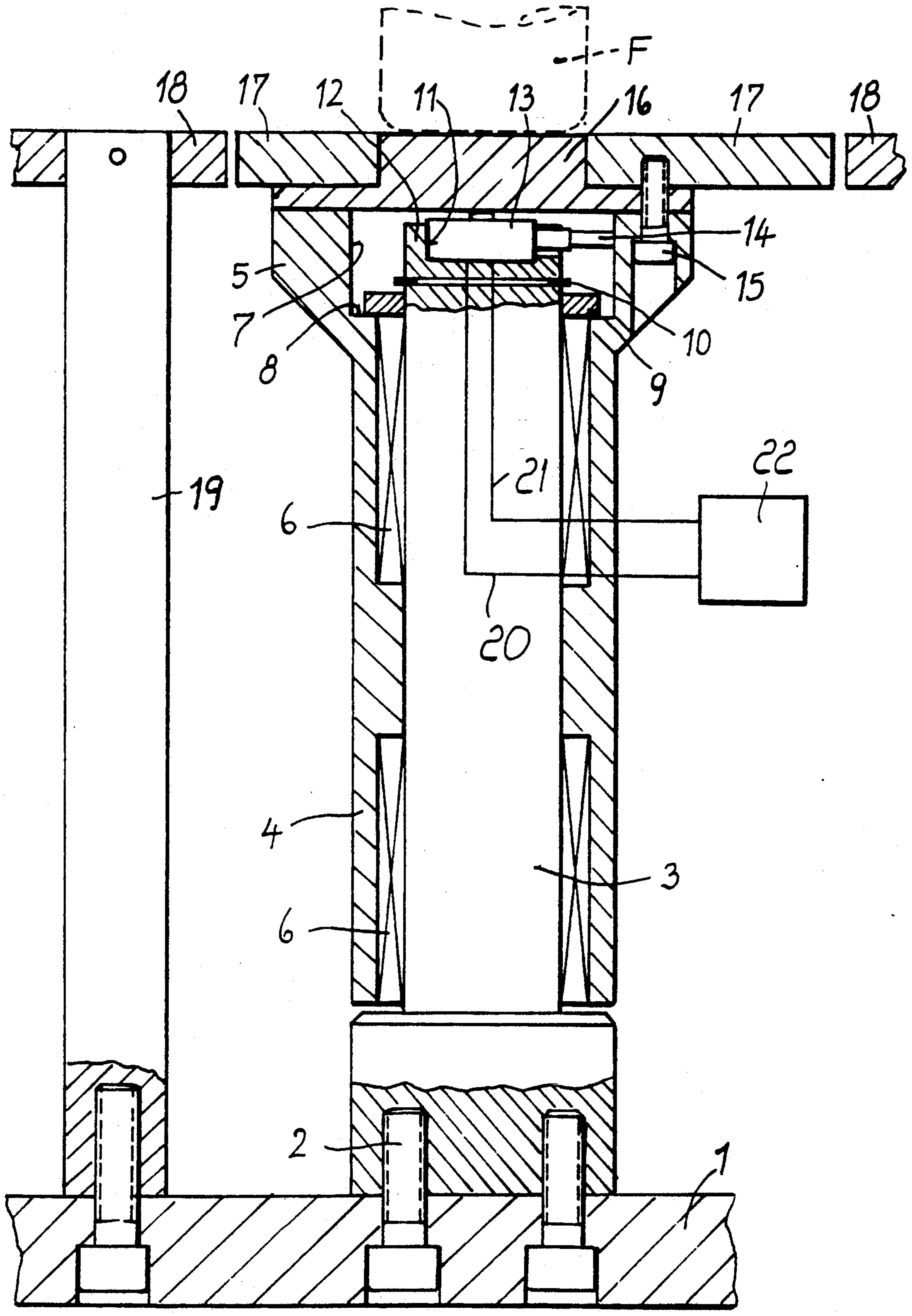
F
18
17
12
11
13
16
17
18
14
15
5
7
8
10
9
19
22
21
6
20
4
3
6
2
1

PRESSURE ADJUSTMENT DEVICE

BACKGROUND OF THE INVENTION

The present invention relates to a pressure adjustment device, particularly for adjusting the closing pressure of medicine bottle stoppers during a ferruling operation.

As is known, the mouth of medicine bottles is provided with an outer collar on which the edge of a mushroom-shaped rubber closure stopper rests. In order to retain the stopper in a closed position, a ferrule is provided which is constituted by a metallic circular band whose upper and lower edges are folded above the stopper and below the collar of the bottle with an operation termed ferruling. The folding of the upper and lower edges of the ferrule is performed by means of rollers which act on the edges while the bottle is rotated.

In order to ensure the tight seal of the stopper on the mouth of the bottle, there is a presser element which keeps the stopper pressed on the collar of the bottle during the ferruling step.

This operation however requires an exact application of the force which presses on the stopper in order to avoid risks of breakage of the bottle and at the same time ensure the necessary tightness of the seal.

SUMMARY OF THE INVENTION

The aim of the present invention is to provide a device which is suitable for measuring and adjusting the pressure with which the rubber stoppers are closed.

Within the scope of this aim, a further object of the invention is to provide a device which is simple in concept and safely reliable in operation.

This aim and this object are achieved by a pressure adjustment device as defined in the appended claims.

BRIEF DESCRIPTION OF THE DRAWINGS

The details of the invention will become apparent from the detailed description of a preferred embodiment of the pressure adjustment device, illustrated only by way of non-limitative example in the accompanying drawing, wherein:

the only figure is a vertical sectional view of the device according to the invention.

DESCRIPTION OF THE PREFERRED EMBODIMENTS

With reference to the above figure, the device has a horizontal base 1 on which a stationary vertical column 3 is fixed with bolts 2.

A sleeve 4 is coaxially arranged about the column 3 and is provided, at its upper end, with a portion having a larger diameter which defines a collar 5.

Bearings 6 are inserted between the column 3 and the sleeve 4 and allow the sleeve to rotate about the column.

An axial cavity 7 is defined in the collar 5, is open upward and is crossed by the upper part of the column 3. An annular shoulder 8 is thus defined inside the cavity 7, and a ring 9 rests thereon; a snap ring 10 is mounted above said ring 9 around the upper end of the column 3 in a groove provided therein.

An axial seat 11 is defined in the upper end of the column 3, is open upward and is delimited by an annular wall 12. A load cell 13 is accommodated in the seat 11, and its measurement tip protrudes from the edge of the wall 12. The load cell 13 is connected, by means of electrical conductors 20, 21 14, to an external means 22 for evaluating the pressure exerted thereon and for controlling the optimum pressing force.

A disk 16 is fixed to the collar 5 by means of a series of screws 15 and constitutes the supporting plane for the bottles to be closed.

A guide 17 is provided co-planar to the disk 16 for the bottles arriving from a conveyance plane 18 which is fixed to the top of columns 19 which rise from the base 1.

The operation of the described device is as follows.

The bottle to be closed is conveyed onto the disk 16, where it is arranged coaxially to the column 3. The bottle F is already provided with the stopper, which is inserted so as to close the mouth but is not yet locked by the ferrule. By means of a punch element which descends onto the bottle, the stopper is pressed with a pressure force which is transmitted, through the end plate 16, onto the load cell 13, during the ferruling operation in which the bottle F, and accordingly the disk 16 and sleeve 4, are rotated about the axis of the column 3. The load cell 13 therefore provides an indication which allows to set the pressing force to an optimum value independently of the size tolerances of the bottle, so as to achieve a constant contact pressure between said stopper and said bottle and thus ensure the conditions for perfect ferruling and maximum tightness.

From the foregoing, it will be apparent that pressure is generated by the action of the punch element descending onto the bottle F. The load cell 13 is connected to the external means for evaluating and controlling the pressure which acts on the disk 16, whereby to adjust and optimize the pressure applied to the bottle F during the ferruling operation:

I claim:

1. A device for sensing pressure applied to a bottle during a ferruling operation comprising:
   - a stationary vertical column having a column upper end;
   - a sleeve rotatably supported on said stationary vertical column and having an upper end;
   - a horizontal disk for supporting a bottle, said horizontal disk closing said upper end of said sleeve;
   - a load cell located between said upper column end and said disk;
   - means for evaluating pressure exerted on said load cell and for controlling optimum pressing force, and;
   - electrical conductors connecting said load cell to said means for evaluating pressure and for controlling said optimum pressing force.

2. Device for sensing pressure according to claim 1, further comprising an axial seat, said axial seat being defined in said upper column end and delimited by an annular wall, said load cell being accommodated in said axial seat.

3. Device for sensing pressure according to claim 1, further comprising:
   - a collar defined by said upper end of said sleeve;
   - an upwardly open axial cavity defined in said collar;
   - an upper part defined by said column and crossing said axial cavity;
   - an annular shoulder defined in said axial cavity;
   - a ring resting on said annular shoulder;
   - a groove formed in said column, and;

a snap ring located above said ring and being mounted in said groove.

4. Device for sensing pressure according to claim 3, further comprising means for fixing said disk to said collar.

5. Device for sensing pressure according to claim 1, further comprising:

an axial seat defined in said upper column end and accommodating said load cell;

an annular wall delimiting said axial seat and having an edge, and a measurement tip connected to said load cell and protruding from said edge of said annular wall.

6. Device for sensing pressure according to claim 1, further comprising:

bearings interposed between said stationary column and said sleeve, for rotatably mounting said sleeve on said stationary column, and;

means for guiding bottles arranged coplanar to said disk.

7. A device for sensing pressure applied to a bottle during a ferruling operation comprising:

a stationary vertical column having a column upper end;

a sleeve supported on said stationary vertical column and having an upper end;

bearings interposed between said sleeve and said stationary column, whereby to permit rotation of said sleeve with respect to said column;

a horizontal disk for supporting a bottle, said horizontal disk closing said upper end of said sleeve;

a load cell located between said upper column end and said disk;

an axial seat defined in said upper column end and accommodating said load cell;

an annular wall delimiting said axial seat, and measurement means connected to said load cell and protruding from said annular wall;

means for evaluating pressure exerted on said load cell and for controlling optimum pressing force;

electrical conductors connecting said load cell to said means for evaluating pressure and for controlling optimum pressing force.

8. Device for sensing pressure according to claim 7, further comprising:

a collar defined by said upper end of said sleeve;

an upwardly open axial cavity defined in said collar;

an upper part defined by said column and crossing said axial cavity;

an annular shoulder defined in said axial cavity;

a ring resting on said annular shoulder;

a groove formed in said column, and;

a snap ring located above said ring and being mounted in said groove.

9. Device for sensing pressure according to claim 7, further comprising:

means for guiding bottles arranged coplanar to said disk, and;

means for fixing said disk to said collar.

* * * * *